Sept. 16, 1958  W. M. PINE  2,852,109
BUILDING CONSTRUCTION
Filed Jan. 10, 1956

INVENTOR:
WILBUR M. PINE
BY
Marzall, Johnston, Cook & Root.
ATT'YS

United States Patent Office 2,852,109
Patented Sept. 16, 1958

2,852,109

BUILDING CONSTRUCTION

Wilbur M. Pine, Washington, D. C.

Application January 10, 1956, Serial No. 558,266

5 Claims. (Cl. 189—1)

This invention relates in general to building structures and is particularly directed to a novel building construction capable of utilizing the principles of thermodynamics as they are related to the control of interior moisture-vapor conditions thereby resulting in a building having unique heat transfer characteristics which permit the effective and simultaneous control of both temperature and relative humidity levels within the building.

Attempts have been made heretofore to erect various types of buildings with air vent spaces, for the purposes of dissipating heat from within the building through ventilators, and/or with layers of cellular or reflective materials, for the purpose of retarding the heat transfer through the walls of the building. Such structures have been unsatisfactory for the control of interior moisture-vapor levels in several respects. For example, the effective control of relative humidity levels within the building require a positive means of alternatively rejecting and holding heat within the building as outside temperatures and humidity levels pass through abrupt and sudden variations. Reliance on ventilation is ineffective because ventilating air is unstable as to its moisture-vapor contents. Reliance on insulation is unsatisfactory, inasmuch as heat cannot be transferred rapidly through it.

The present invention overcomes the foregoing disadvantages wherever it is necessary to prevent condensation within a structure such as storage areas or warehouses where machinery and similar types of equipment may be stored. This application, however, is by no means so limited, the foregoing being mentioned merely by way of specific example.

One of the main problems in the storage of machinery, mechanized equipment, tools, vehicles, and the like, is the oxidation of the metal parts through condensation of moisture-vapor. When the outside temperature of the atmosphere is high and the heat is conducted through the building walls and roof to the interior thereof, the inside temperature also rises and the relative humidity decreases. In an area where the temperature drops at night an increase in the relative humidity of the inside atmosphere results and the moisture of the air condenses on surfaces within the building, causing oxidation of the material and equipment therein.

With the present invention such problems have been effectively overcome due to the maintenance of a relatively constant temperature within the building, or at least substantially so, to an extent that the relative humidity remains substantially constant and condensation is avoided.

It is, therefore, one of the principal objects of the present invention to provide a building structure capable of overcoming the objections and disadvantages of present known constructions with respect to temperature and humidity problems as aforesaid.

Another object of the invention is to provide a building construction which consists of an interior structure to which is secured a plurality of low heat conducting spacer members over which a sheathing is applied, thereby to provide air spaces between the interior structure and the sheathing.

A further object of the invention is to provide a building construction having air spaces between the interior structure and an exterior sheathing wherein the sheathing has a reflective surface thereon to reflect heat directed thereagainst.

Still another object of the invention is to provide a building construction wherein the interior structure is formed of a plurality of arched trussless members having troughs formed lengthwise thereof and wherein an outer sheathing is applied to low heat conducting spacer members between the sheathing and interior structure so that any heat which may be conducted through the sheathing and into the space between the sheathing and the interior structure will not be transferred by the spacer members, but instead will be carried upwardly to a vent at the top part of the building.

A still further and more specific object of the invention is to provide a building construction having an exterior sheathing thereon spaced from the interior structure and wherein the outer lower terminal edges of the sheathing are provided with a shutter or flap member capable of being opened under certain conditions to cause air to flow upwardly through a vent at the top of the building, or which may be closed under certain other conditions, thereby to provide a dead air insulating space between the outer sheathing and the inner structure.

Other objects and advantages of the invention will become apparent upon reading the following description taken in conjunction with the accompanying drawing, in which.

Figure 1:
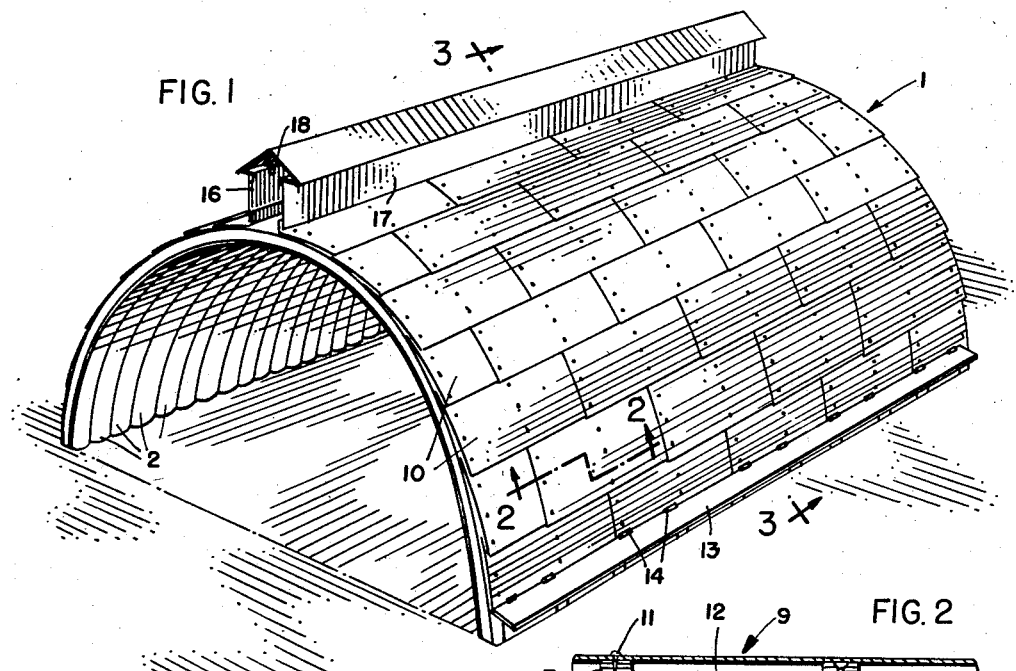
Fig. 1 is a perspective view of a building embodying the present invention.

Briefly described, the invention may be said to consist of three essential elements. The first is the interior structure which is preferably made up of a plurality of arch members secured together in side-by-side relation. Each arch member includes a plurality of elongated panels, longitudinally arched, and each of which has a trough formed lengthwise thereof. These panels are placed in end-to-end overlapping relation and secured together to form a unitary arch member. Low heat conducting spacers are spaced apart throughout the length of the building, or interior structure, and are arched to conform to the radius of the arch members. These spacers are then secured to the interior structure and a sheathing is then applied to these spacer members to cover the building.

The formation of a trough in the arched panel members enables each arch member to be self-supporting so that the completed building may be said to be trussless to the extent that no additional trusses are necessary for support. The trough in the panels also lends itself particularly well to the present invention by reason of the fact that the air space between the interior structure and the outer sheathing is thus enlarged to a degree which makes possible the rapid carrying off of the warm air within such space.

Referring now more particularly to the drawing, the building itself is indicated generally by the numeral 1. As above mentioned, the building consists of a plurality of arch members 2 which are secured together in side-by-side relation lengthwise of the building. This has the advantage that the building may be made as long as desired by merely erecting additional arch members.

Each arch member 2 comprises a plurality of elongated panels 3 which are arched longitudinally thereof and which are secured together in overlapping end-to-end relation. The particular radius of these arched panels may be changed as desired to suit individual needs. For example, all of the panels may have the same radius of curvature as illustrated herein, in which event the resulting building structure will be substantially semi-circular. On the other hand, the end panels may have a greater radius of curvature so as to provide substantially straight side walls for several feet upwardly from the ground, and then have additional panels of a lesser radius secured thereto to complete the arch. In any event, the particular radius forms no part of the present invention and may be varied as desired.

Figure 2:
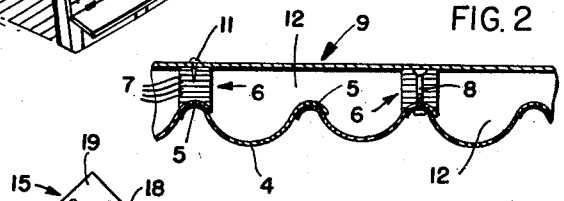
Fig. 2 is an enlarged fragmentary longitudinal section taken along the plane of line 2—2 of Fig. 1.
Figure 3:
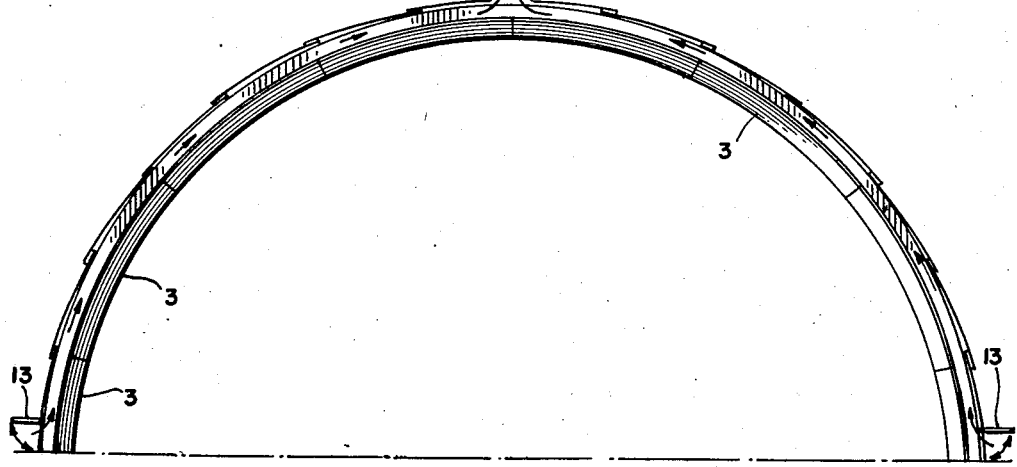
Fig. 3 is an enlarged transverse sectional view taken along the plane of line 3—3 of Fig. 1.

The preferred form of each of the longitudinally arched panels includes a trough 4 formed lengthwise thereof, with the longitudinal edges 5 thereof curved as shown in Fig. 2, or otherwise formed to receive the corresponding edge of an adjacent panel in overlapping relation therewith in order that they may be secured together in side-by-side relation.

It is preferred that these arched panels 3 be formed of a suitable metal, such as steel or aluminum, although it will be evident that the particular material does not form a part of the invention. It may also be stated here that the manner of arching the panels to produce a specific radius may be left to the desires of the manufacturer. The panels may be transversely corrugated, drawn, stamped, or otherwise formed. It should also be noted that the trough 4 need not extend throughout the entire width of each panel as illustrated herein, although the form shown is preferred.

Low heat conducting spacer members generally indicated by the numeral 6 are applied to the arch members longitudinally thereof at spaced apart points throughout the length of the building. These spacer members 6 are preferably located along the arcuate edge portions of each panel and are arched longitudinally so that they will have the same radius as the arch member throughout the length that they are applied thereto. These spacers may be applied so that one or more adjacent troughs are included within a single space or air passage, two being shown for purposes of illustration.

Again, the spacer members 6 may be any material capable of being curved on a radius longitudinally and which is low heat conducting. Wood has been found in actual practice to be very desirable, particularly when it is made up of a plurality of plies, as indicated at 7. It will be appreciated that the spacer members provided may be constructed of any configuration and from any material which would result in providing a low heat conducting spacer member. These longitudinally arched spacer members are then secured at the desired locations to the interior structure by means of the bolts 8.

A sheathing generally indicated at 9 is then applied over the entire structure and may consist of a plurality of separate sheets 10. These sheets are then applied in properly oriented and overlapping relation to the spacer members and secured thereto by screws, bolts or nails 11.

While the sheathing material is preferably metallic having a reflective exterior surface, good results may also be had by the use of other types of sheet material, such as a plastic or even a canvas which has been coated with a suitable material so that the exterior surface thereof is capable of reflecting light and heat.

Viewing Fig. 2 it will be evident that an air space or passage 12 is provided between the exterior sheathing 9 and the interior structure consisting of the arch members 2. The spacer members 6 will prevent the passage of air from one air space to an adjacent air space. These air spaces or passages are continuous from the lower end of the sheathing to the top center or ridge of the building, as will presently be seen.

An important feature of the present invention resides in the provision of a shutter or flap member 13 hinged as at 14 to the lower edge of the exterior sheathing. The sheathing terminates upwardly from the bottom of the building at the ground level a distance of one or two feet, as desired. The shutter 13 is then hinged as at 14 to the lower edge of the sheathing, and this shutter may be either a single unit extending the length of the building or may consist of a plurality of units, as desired. Also, it will be evident that other ways of mounting the shutter may be used, such as sliding means.

A suitable vent is also provided at the top of the building, as indicated generally by the numeral 15, and may be of any suitable construction. For purposes of illustration, a simple type of vent structure is shown which includes the upwardly extending side members 16 and 17 mounted in spaced apart relation at the upper terminal edges of the exterior sheathing at each side of the longitudinal center line of the roof. The sheathing at each side of the building will terminate short of the center line thereof at the top of the building, thereupon leaving an opening to the atmosphere which communicates with the spaces or air passages 12. A plurality of brackets 18 spaced along the length of the side members 16 and 17 support the top part 19 of the vent. Air is thus allowed to escape from the passageways 12 to the atmosphere through the vent construction. The top portion 19 is applied thereto primarily for the purpose of preventing rain or snow from entering the air spaces between the sheathing and the interior structure.

The end walls or bulkheads for the building may assume any desired construction and form no part of the present invention. It is preferred that the end walls also be so constructed as to have inner and outer walls with a closed air space therebetween which may be used for insulating purposes only.

When the shutters 13 are in an open position at each side of the building as illustrated, air is permitted to flow over the entire surface of the interior structure. This air will be carried upwardly and discharged through the vent at the top of the building. When the shutters 13 are in closed position, a blanket of relatively motionless air is entrapped. Thus, the space between the interior structure and the exterior sheathing may be either ventilated to remove excess heat, or may be closed to create an insulating effect.

In periods of high outside temperatures the sensible heat penetrating the reflective outer sheathing will be carried off largely by permitting air to flow between the inner and outer surfaces, and the penetration of radiant heat will be greatly reduced by this air space. Similarly, excessive heat generated within the building can escape into this air stream by transfer through the interior structure.

In periods of low temperatures the dead air blanket created by closing the shutters 13 becomes the equivalent of several inches of conventional type insulation over the entire roof surface.

Thus, the building embodying the present invention can have the interior temperatures thereof controlled far more effectively than any conventional type of structure by regulating the heat transfer through the air spaces or passageways 12. By opening the shutters 13 during the heat of the day, much of the heat will be carried off rather than penetrating to the interior of the building. By closing these shutters when the outside temperature drops, the dead air space thus created acts to insulate against the transfer of heat from inside the building so that the temperature within the building remains fairly constant. Temperature being a factor of relative humidity, condensation of moisture within the building due to excessive drops in temperature will be minimized, thereby enabling the storage of machinery and similar types of materials and equipment for much greater periods of time without fear of oxidation.

It has been stated herein that the interior structure is self-supporting, and that the spacers and sheathing are supported thereon. It is also within the scope of the invention to have the arch, spacers and sheathing as a structural composite which is self-supporting in combination, even though the components might not be self-supporting separately. Furthermore, the spacers might be self-supporting as a separate component, and the interior structure and sheathing supported thereby.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. An elongated transversely arched building comprising, an interior structure consisting of a plurality of arch members secured together in side-by-side relation to form a self-supporting trussless structure, each of said arch members including a plurality of elongated and longitudinally arched panels having an outwardly facing trough portion extending throughout the length thereof and secured together in end-to-end relation; a plurality of arched low heat conducting spacer members spaced apart along the length of said interior structure and secured to the outermost portions of said arch members longitudinally thereof; an outer sheathing over said spacer members and secured thereto, thereby providing a plurality of juxtaposed air passages between said interior structure and said outer sheathing, said sheathing terminating at the lower edges thereof short of the ends of said arch members thereby defining openings in said outer sheathing; whereby said air passages will be in communication at their lower ends with the atmosphere; the cross sectional area of the openings being substantially equal to the cross sectional area of the air passages, a shutter member disposed below the lower edges of said sheathing and movable to open and closed positions, whereby movement of air through said air passages will occur when said shutter member is in open position and the air in said air passages will be substantially immovable when said shutter member is in closed position, and a continuous air vent extending longitudinally along the entire top part of the building above said interior structure in communication with said air passages.

2. An elongated transversely arched building, in combination; an interior structure consisting of a plurality of arch members secured together in side-by-side relation to form a self-supporting trussless structure, each of said arch members including a plurality of elongated and longitudinally arched panels secured together in end-to-end relation; a plurality of imperforate, arched, low heat conducting spacer members spaced apart along the length of said interior structure and secured to said arch members longitudinally thereof; an outer sheathing over said spacer members and secured thereto, thereby providing a plurality of juxtaposed air passages between said interior structure and said outer sheathing, said sheathing terminating at the lower edges thereof short of the ends of said arch members thereby defining openings in said outer sheathing; whereby said air passages will be in communication at their lower ends with the atmosphere; the cross sectional area of the openings being substantially equal to the cross sectional area of the air passages, a shutter member disposed below the lower edges of said sheathing and movable to open and closed positions, whereby movement of air through said air passages will occur when said shutter member is in open position and the air in said air passages will be substantially immovable when said shutter member is in closed position, and a continuous air vent extending longitudinally along the entire top part of the building above said interior structure in communication with said air passages.

3. The structure as defined in claim 2, wherein the outer sheathing is reflective.

4. An elongated transversely arched building, in combination; an interior structure consisting of a plurality of arch members secured together in side-by-side relation to form a self-supporting trussless structure, each of said arch members including a plurality of elongated and longitudinally arched panels having an outwardly facing trough portion extending throughout the length thereof and secured together in end-to-end relation; a plurality of arched low-heat conducting spacer members spaced apart along the length of said interior structure and secured to the outermost portions of said arch members longitudinally thereof; an outer sheathing over said spacer members and secured thereto, thereby providing a plurality of juxtaposed air passages between said interior structure and said outer sheathing, said sheathing terminating at the lower edges thereof short of the ends of said arch members thereby defining openings in said outer sheathing; whereby said air passages will be in communication at their lower ends with the atmosphere; the cross sectional area of the openings being substantially equal to the cross sectional area of the air passages, and a continuous air vent extending longitudinally along the entire top part of the building above said interior structure in communication with said air passages.

5. An elongated transversely arched building comprising an inner wall, an outer wall, a plurality of arched spacer members spacing said walls apart, thereby defining air passage means extending transversely of said building, a continuous ventilator extending along the top of said building and having continuous air vents, one on each side thereof, both of which communicate with said air passage means, said outer wall terminating at the lower edges thereof short of the ends of said arched members thereby defining openings in said outer wall to intercommunicate the lower ends of the air passage means with the atmosphere, the total cross sectional area of the opening being substantially equal to the cross sectional area of the air passage means, and a shutter member disposed at the lower edges of said outer wall for selectively closing said openings.

References Cited in the file of this patent

UNITED STATES PATENTS

| | | |
|---|---|---|
| 2,214,886 | McKeown | Sept. 17, 1940 |
| 2,390,418 | Brown | Dec. 4, 1945 |
| 2,499,478 | Feser | Mar. 7, 1950 |

FOREIGN PATENTS

| | | |
|---|---|---|
| 922,320 | France | Jan. 27, 1947 |
| 649,572 | Great Britain | Jan. 31, 1951 |